June 30, 1970  W. A. GHISELLI, JR  3,517,997
DOCUMENT FEEDING AND EXPOSURE MEANS FOR AN OFFICE COPIER
Filed Oct. 16, 1967  2 Sheets-Sheet 1
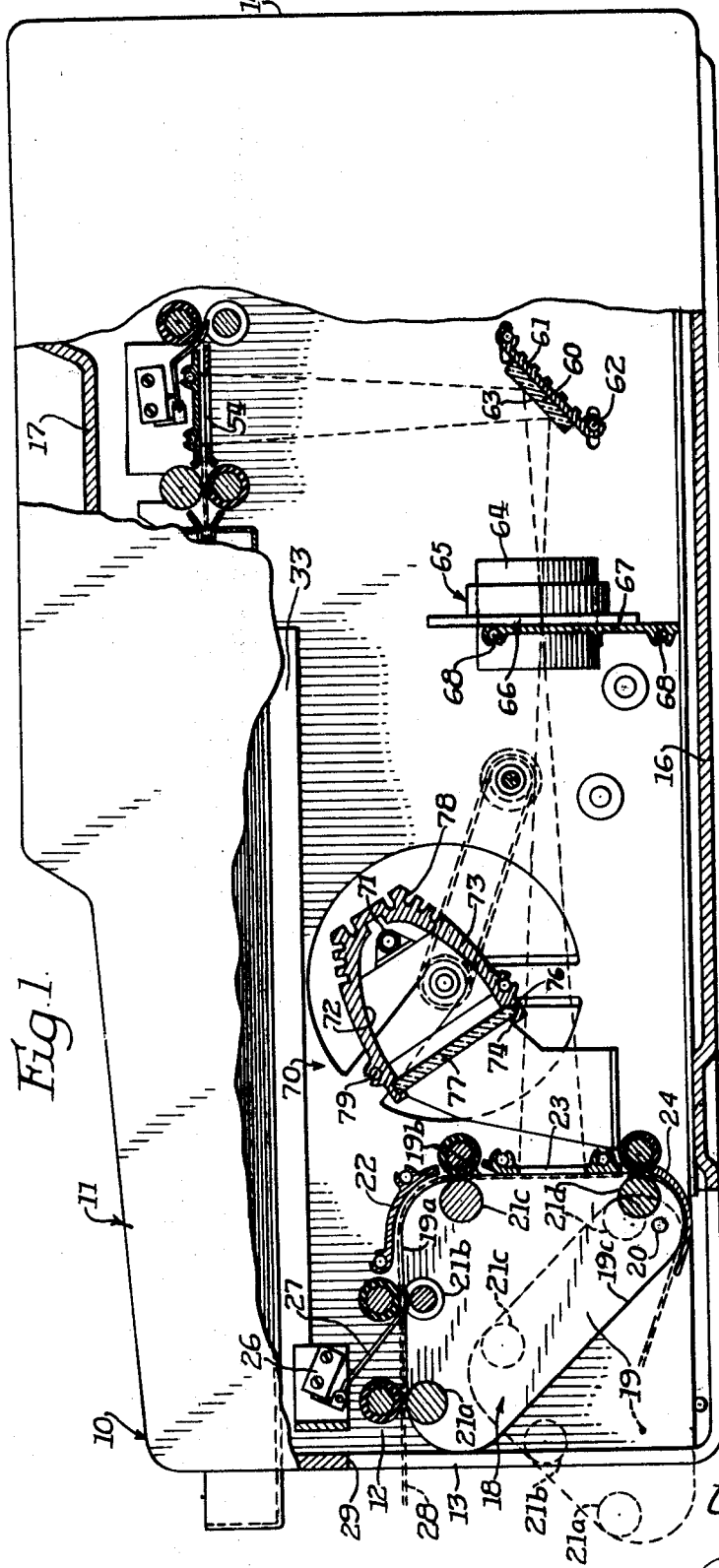
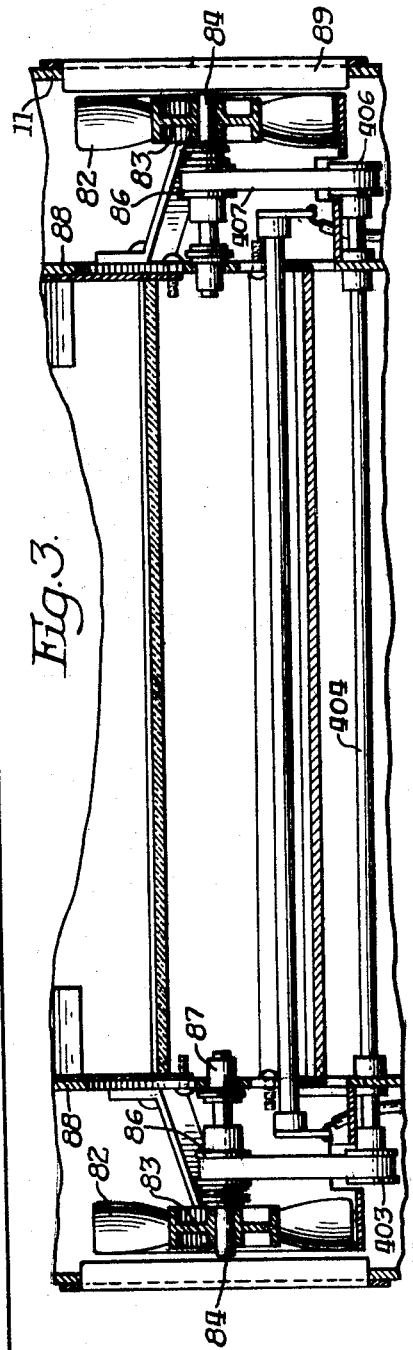
Inventor
William A. Ghiselli, Jr.
By *Jack H Hall* Atty.

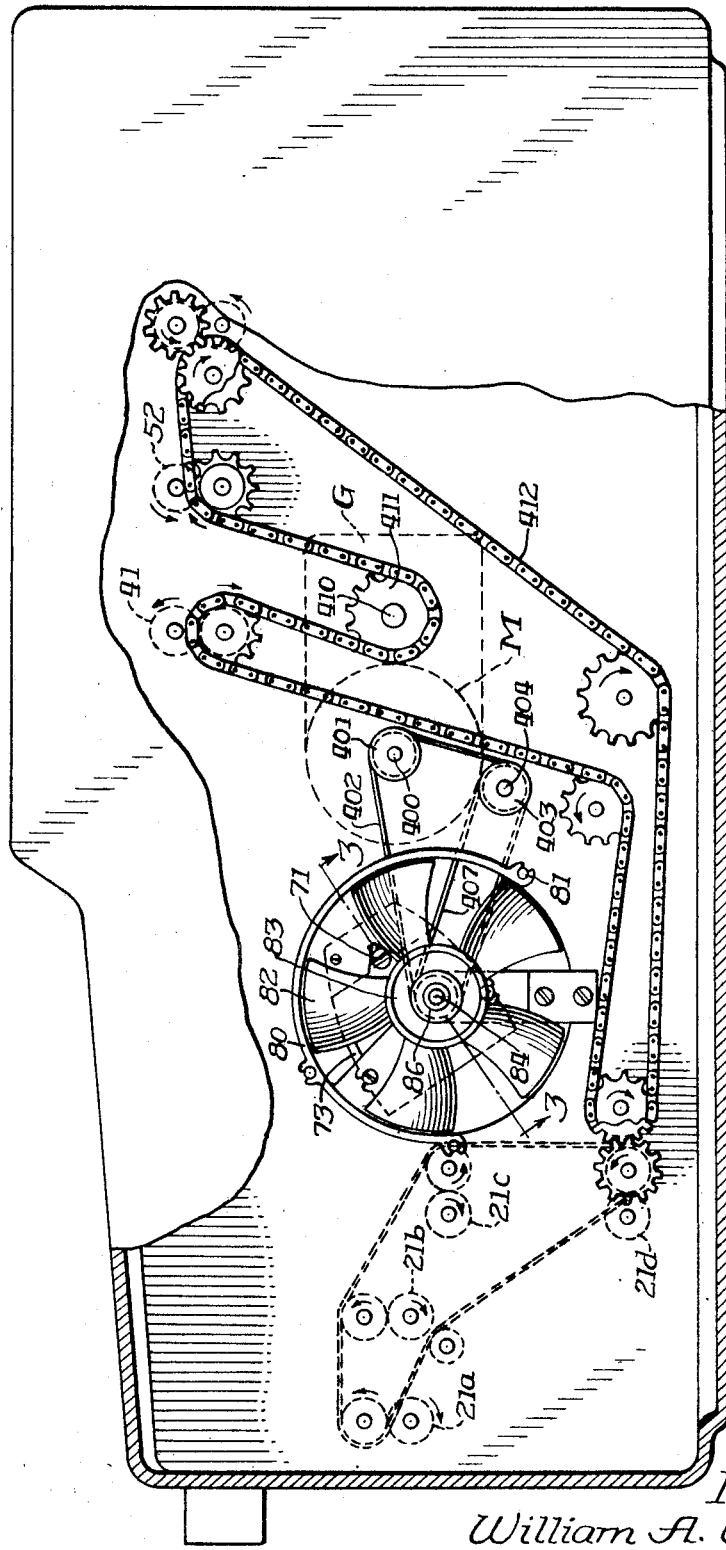

United States Patent Office 3,517,997
Patented June 30, 1970

3,517,997
DOCUMENT FEEDING AND EXPOSURE MEANS FOR AN OFFICE COPIER
William A. Ghiselli, Jr., Des Plaines, Ill., assignor to Bell & Howell Company, Chicago, Ill., a corporation of Illinois
Filed Oct. 16, 1967, Ser. No. 675,459
Int. Cl. G03b 27/76
U.S. Cl. 355—71                               1 Claim

ABSTRACT OF THE DISCLOSURE

Feeding and transport means for feeding an original document through an office copier wherein plural pairs of transport rollers each forming a nip and prescribing a transport path extending through an exposure station are carried in a frame which is pivotally mounted for movement between a first nip forming position and a second open clearing position thereby to facilitate clearing of any paper jams. An arcuate shield extending circumferentially at least 180° surrounds the lamp and reflector and provides a confined zone for translating cooling air therethrough to remove heat from the lamp and reflector and prevent transmission of heat to the remainder of the machine.

BACKGROUND OF THE INVENTION

Field of the invention

The invention herein disclosed relates to the field of art pertaining to office copiers and specifically to a feeding and transport means for directing an original document through an exposure station.

Description of the prior art

The prior art shows many forms of office copiers wherein an original document is directed into a feeding and transport mechanism prescribed by the nips formed between transport rollers. However, in such disclosures the transport rollers are usually mounted in a common frame. As the original document is directed through the exposure station of the usual prior art arrangement it is illuminated by a light source. One form of prior art illumination means is depicted in Sugarman Jr. 3,088,386 wherein the elongated light source is discontinuous at the center portion thereof and wherein two separate housings including a lamp housing and an optical housing are provided, there being light transparent material interposed between the two housings for isolating them against the passage of air.

SUMMARY

The present invention is particularly characterized by an apparatus for feeding and transporting original document material through an office copier and in accordance with the present invention plural pairs of transport rollers each form a nip and prescribe the transport path. A frame carries one of the rollers of each respective pair of transport rollers and is pivotally mounted for movement between a first nip forming position and a second open clearing position, thereby to facilitate clearing of paper jams. Further, the exposure station is characterized by utilization of an elongated halogen quartz light source and a trough-shaped open-ended reflector having an elliptical reflective surface disposed in alignment with the light source. An infrared filter extends across the trough opening of the reflector to filter thermal energy and an arcuate shield extends circumferentially through at least 180° thereby to surround substantial portions of the light source. Air translation means at opposite ends of the shield circulate air around the light source and through the reflector for cooling purposes.

BRIEF DESCRIPTION OF THE DRAWINGS

FIG. 1 is a cross-sectional view part showing elevation and part shown somewhat schematically showing an office copier provided in accordance with the principles of the present invention;

FIG. 2 is a fragmentary view generally similar to FIG. 1 but showing additional details of the feeding and transport means and the air translation means utilized in conjunction with the exposure station; and FIG. 3 is a cross sectional view taken on line III—III of FIG. 2.

DESCRIPTION OF THE PREFERRED EMBODIMENTS

While the inventive developments herein disclosed are of general utility, a particular useful application is found in an office copier of a desk type size. A machine embodying the principles of the present invention is shown generally at 10. A casing 11 forms a housing for the machine or apparatus and has a hollow interior forming a compartment or enclosure 12 having a front wall 13, a rear wall 14, a bottom wall 16 and a top wall 17.

Disposed adjacent the lower portion of the front wall 13 is a feeding and transport mechanism for original document material shown generally at 18. More specifically, the feeding and transport mechanism utilizes a frame member 19 which is pivotally mounted on a pivot pin 20 to the casing 11. The frame member 19 rotatably mounts one of each set of a plurality of transfers rollers consisting of matched pairs of rollers shown at 21a, 21b, 21c and 21d. The frame 19 is movable from a full line position to a second dotted line position, as shown in FIG. 1. The mating rollers of each of the transfer rollers are rotatably mounted in stationary position in the casing 11 so that the full line position corresponds to a nip-forming position with each set of rollers 21a, 21b, 21c, 21d prescribing a transport path. In the second position shown in dotted lines, the frame is positioned in an open clearing position so that the rollers are separated from one another to facilitate removal of paper jams in the event a document becomes jammed in the transport path.

There is additionally provided along the boundary of the transport path a curved direction-changing baffle 22 and an exposure window shown at 23, as well as a second direction-changing baffle 24.

A sensor switch is shown at 26 and has a sensing finger 27 extending into the transport path between the rollers 21a and 21b for engagement with the edge of an original document shown at 28.

In addition to carrying the rollers, the frame 19 has an upper leg 19a and a vertical leg 19b which provides a guide surface and cooperates with the confronting adjacent surfaces of the baffles 22 in the window 23 and prescribing a transport path. A third leg 19c is also provided so that the legs 19b and 19c cooperate with the baffle 24 as well.

Accordingly, an original document to be copied is fed into the machine face up and the edges inserted into the nip of the first set of rollers 21a. The document is then advanced by the rollers 21a along the transport path prescribed by the wall 19a of the frame 19 and the leading edge of the document engages the feeler arm 27 of the control switch 26. The document is picked up by the rollers 21b and is further advanced against the baffle 22, thereby changing the direction of the document into the nip of the rollers 21c and along the path prescribed by the leg 19b of the frame 19.

The document then passes through the exposure station formed by the window 23, whereupon the document is picked up by the nip of the rollers 21b and is guided by the baffle 24, thereby changing direction and guiding the document towards the front wall 13. It will be noted that the front wall 13 has an opening 29 formed therein to facilitate access to the feeding and transport mechanism.

It is contemplated that the image to be reproduced is directed along an optical track extending from the window 23 to a window shown at 54, thereby to project the image appearing on the original document 28 onto a copy sheet. Accordingly, the optical track includes a mirror 60 which is carried on a mirror support 61 engaged on suitable mounting supports 62 carried by the casing 11. The mirror 60 has a reflective surface 63 disposed at approximately a 45° intercepting angle between a window 23 and the window 54. The mirror 60 is adjustably mounted to permit selected compensation for lens position.

Additionally, there is provided a lens assembly shown generally at 65 and including a lens housing 64 carried in a frame 66 attached to a suitable lens mounting 67 also supported by suitable mounting means 68 in the casing 11. The lens housing 64 is arranged between the window 23 and the mirror reflective surface 63 so that the image appearing on the original document 28 will be focused at the reflective surface 63 and projected to a focal plane corresponding to the photoconductive surface presented by the copy sheet at the window 54.

In order to illuminate the original image at the window 23, an illumination means is provided in accordance with the principles of the present invention as shown generally at 70.

The illumination means includes an elongated halogen quartz light source 71 positioned at the focal point of an elliptical figure reflective surface 72 formed by a generally trough-shaped reflector member 73. The trough-shaped member 73 is open ended and also has a trough opening 74 characterized by the formation in opposite legs thereof of a recess 76 receiving a flat lens 77 constituting an infrared filter, thereby to prevent excessive thermal energy from reaching the exposure station at the window 23 which might cause excessive heating of the original document 28.

The reflector member 73 also has thickened walls longitudinally grooved as at 78, thereby to provide radiator fins for additional dissipation of thermal energy. The walls are provided with mounting receptors cooperating with suitable mounting means 79 thereby to carry the reflector member 73 in the casing 11.

As shown in FIG. 2, an arcuate shield 80 extends through more than 180° of circumferential length and is carried by mounting means 81 in the casing in radially outwardly spaced relation to the reflector member 73, thereby preventing transmission of thermal energy from the light source into the remainder of the machine. The arcuate shield 80 extends coextensively with reflector member 73 and there is positioned at opposite ends thereof air translation means taking the form of fan blades 82 mounted on a hub 83 rotatably carried on a shaft 84 and having a driving pulley 86. The inboard end of each shaft 84 is journaled in an appropriate bearing 87 carried by framing members 88 forming part of the casing structure. Upon rotation of the fan blades 82, air is translated through the confined zone prescribed by the arcuate shield 80 and is also directed through the open ends of the reflector member 73. The side walls of the casing 11 are provided with vents 89 (FIG. 3) in register with the fan blades 82 so that the excess thermal energy may be readily dissipated outside of the enclosure of the casing 11.

The rotating components of the transport system are rotatably driven from a common driving motor shown generally in FIG. 2 at M. The motor M has a takeoff shaft 400 to which is connected a driving pulley 401 over which is trained a pulley belt 402. The belt 402 engages a first pulley wheel 86 on one side of the machine and thereby drives one of the air translation means 82, 83 rotatably. The belt 402 also engages a driving pulley 403 connected to the end of a shaft 404, which shaft 404 extends to the other side of the machine and has a driving pulley 406 connected thereto which is interconnected with the other driving pulley 86 of the other air translation means 82, 83 by means of a pulley belt 407. Thus, both air translation means are driven in unison with one another.

The motor M also has a gearbox G with a power takeoff shaft 410 to which is connected a sprocket 411. Suitable sprockets are connected to the various drive members of the transport rolls and a timing belt 412 is threaded over all of the various sprockets including the drive sprocket 411 to drive all of the transport rollers in unison with one another.

Although minor modifications might be suggested by those versed in the art, it should be understood that I wish to embody within the scope of the patent warranted hereon all such modifications as reasonably and properly come within the scope of my contribution to the art.

I claim as my invention:

1. In an office copier, an illumination means comprising a trough-shaped open-ended reflector having an internal elliptical reflective surface and an outer heat-dissipating surface, an elongated halogen quartz light source disposed in axial alignment with said reflector and along the focal point of said elliptical reflective surface, an infra-red filter extending across the trough opening of said reflector to filter thermal energy, an arcuate shield extending circumferentially through at least 180° and surrounding substantial portions of said light source and reflector and spaced radially outwardly thereof, and air translation means at opposite ends of said shield to direct air in one direction through said shield whereby cooling air is directed through the open ends of said reflector along said light source and said internal surface of said reflector and is simultaneously directed along said outer heat-dissipating surface of said reflector.

References Cited

UNITED STATES PATENTS

| 2,310,148 | 2/1943 | Horn | 355—104 X |
| 2,627,203 | 2/1953 | Hessert | 355—64 X |
| 3,302,519 | 2/1967 | Young | 355—67 X |

JOHN M. HORAN, Primary Examiner

U.S. Cl. X.R.

355—11, 30